3,169,924
ALKALI FUSION OF COPOLYMERS OF MONO-OLEFINS AND VINYL ESTERS
Arnold J. Morway, Clark, and Jeffrey H. Bartlett, New Providence, N.J., assignors to Esso Research and Engineering Company, a corporation of Delaware
No Drawing. Filed Nov. 24, 1961, Ser. No. 154,855
5 Claims. (Cl. 252—40)

This invention relates to products obtained by alkali fusion of unsubstituted and substituted copolymers of $C_2$ to $C_{16}$ alpha olefin and vinyl ester, the process of manufacturing said products, and oil compositions containing said products. The invention also relates to lubricating oil compositions containing mixed metal salts of fatty acid and acid derived from the alkali fusion of unsubstituted or alkyl substituted copolymers of $C_2$ to $C_{16}$ alpha olefins and a vinyl ester.

Valuable materials for lubricant manufacture can be obtained by fusing copolymers of $C'$ to $C_{16}$ monoolefins and a vinyl ester of a carboxylic acid, at high temperatures with caustic alkali, using about 2 to 4 moles of alkali per mole of vinyl ester in the copolymer. An alkali salt results from the fusion reaction which can be utilized directly in lubricating oils to form greases. Fluid lubricants and other useful hydrocarbon compositions can also be prepared from the fusion product. In addition, the alkali salt of the fusion reaction can be sprung with a strong mineral acid to form organic acids. The organic acids in turn can be converted into other salts, esters, etc., for use in lubricant manufacture, agricultural chemicals, paints, adhesives, etc.

The copolymers which may be used in the present invention are preferably copolymers of monoolefins such as ethylene, propylene, n-butylene, isobutylene, 1-dodecene, etc., and a vinyl ester of a $C_2$ to $C_5$ monocarboxylic acid. The copolymer, on a weight basis may contain 1 to 30, preferably 1.5 to 10 parts of the monoolefin monomer per part of ester monomer. A very desirable copolymer is that of ethylene and vinyl acetate containing about 20% to 30% by weight of vinyl acetate. Minor amounts, e.g. 0.5 to 5 wt. percent of other monomers such as styrene, butadiene, cyclopentadiene, can be present in the copolymer chain.

The average molecular weight of the copolymer will generally be in the range from about 500 to 200,000, e.g. 1,000 to 20,000, said molecular weight being determined by K. Rast's method (Ber. 55, 1051, 3727 (1922)) or with the osmometer. Molecular weight of the polymer is immaterial to the present invention, although the oil-soluble polymers are preferred.

In general, the copolymer can be prepared by conventional peroxide polymerization techniques. For example, to prepare a copolymer of ethylene and vinyl acetate, polymerization can be carried out in a benzene solution using di-tertiary-butyl-peroxide as an initiator at a temperature in the range from about 250° to 340° F., e.g. 300° F., and a pressure of about 700 to 2,000 pounds, preferably about 800 pounds. In a preferred method, using ethylene and vinyl acetate, the autoclave, or similar equipment, containing the solvent, initiator and vinyl ester is purged about three times with nitrogen, and then charged with a sufficient amount of ethylene to yield the desired pressure when heated to the reaction temperature. During the polymerization, additional ethylene gas is added whenever the pressure drops by about 100 p.s.i.g. Polymerization is generally considered complete when there is less than a 50 p.s.i.g. pressure drop per hour. The product is stripped free of solvent and unreacted vinyl acetate under vacuum.

The alkali fusion of the copolymer can be carried out as follows: Alkali metal oxides, or alkali metal hydroxides such as sodium hydroxide or potassium hydroxide, preferably in flake or pellet form, are heated in an inert menstruum with the copolymer to about 450° to 700° F., e.g. 525° to 625° F., for about 1 to 15 hours, or until hydrogen evolution substantially ceases.

The preceding is believed to be represented by the following equations using a copolymer of ethylene and vinyl acetate as an example:

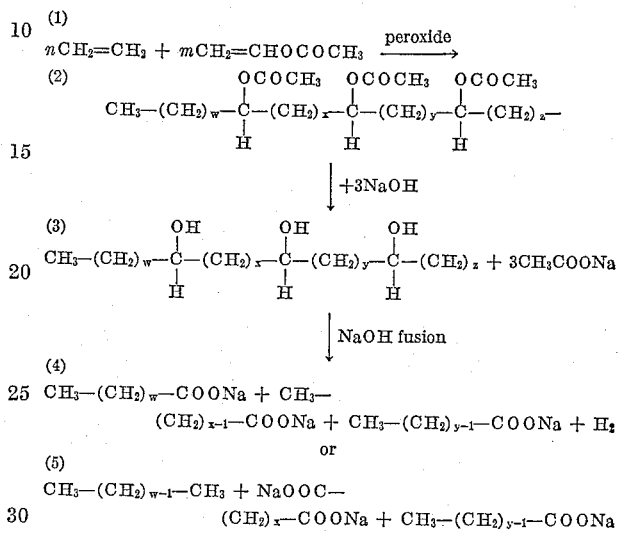

wherein $n$ and $m$ are the respective number of moles of ethylene and vinyl acetate polymerized together, while $w$, $x$, $y$ and $z$ represent the random distribution of ethylene monomers through the chain. A typical segment of polymer chain is therefore represented by Formula 2. Formula 3 illustrates how sodium acetate results by splitting the acetic acid group from the chain. Formulae 4 and 5 represent two probable ways in which the polymer chain breaks apart during fusion to form aliphatic carboxylic acid salts and/or even an aliphatic dicarboxylic acid salt and a hydrocarbon.

The preceding equations are not known with certainty but are believed to represent the reactions of this invention.

If a carboxylic acid product is desired, the reaction mixture after fusion is then cooled and water is added. The mixture can then be extracted with a light hydrocarbon solvent, such as heptane or the like, in order to remove the inert menstruum and unreacted copolymer. The aqueous phase is separated and acidified with a mineral acid such as hydrochloric acid to form an aliphatic carboxylic acid from the fusion salt. The carboxylic acid can then be removed from the aqueous phase by extraction with a light hydrocarbon solvent such as heptane and finally a crude organic acid is obtained by evaporation of the hydrocarbon solvent. While the crude acid can be directly utilized without further purification, it can be purified by vacuum distillation. This acid can then be used for various purposes as previously indicated.

Excellent lubricating greases can be prepared by carrying out the fusion in lubricating oil. Preferred greases are prepared by fusing the copolymer in the presence of fatty acids to form mixed-salt systems comprising alkali metal salts of fatty acids and alkali metal salts of the aliphatic acids formed from the alkali fusion. In this manner, it is possible to eliminate the steps of forming and separating the acid or salt derived from the copolymer. This is preferably carried out by dispersing the fatty acids and the copolymer in the luibricating oil, adding the alkali, preferably in the form of a 40 to 50 percent aqueous solution, and heating to about 250° to 300° F., until the fatty acids are converted to soaps and salts and all the water is volatilized. The alkali fusion step is then carried out by further heating to about 450° to 700° F., e.g. 500 to 600° F. until hydrogen evolution substantially ceases, e.g. about ½ to 6 hours. The lubricant may then be cooled and finished.

These mixed salt systems or complexes are best made to contain 0.1 to 2, preferably 0.4 to 1.0 part by weight of low molecular weight fatty acid per part by weight of copolymer used to make the fusion acid. These systems can also contain 0.5 to 10, preferably 1 to 5 parts by weight of intermediate or high molecular weight fatty acid per part by weight of the copolymer used to form the fusion acid. Greases can be thus prepared containing 5.0 to 40.0 weight percent, e.g. 10 to 35 weight percent of the mixed salt. These greases in turn can be diluted with additional oil to form fluid or semi-fluid compositions containing about 0.1 to 5.0% of the mixed salt. The preceding weight percents are based on the total weight of the composition.

Suitable low molecular weight acids for forming mixed salt compositions include saturated and unsaturated, substituted and unsubstituted aliphatic mono- and polycarboxylic acids having about 1 to 6 carbon atoms. These acids include fatty acids such as formic, acetic, propionic, furoic, and similar acids including their hydroxy derivatives such as lactic acid, etc. Acetic acid or its anhydride is preferred. Mixtures of these low molecular weight acids may be employed if desired.

Intermediate molecular weight fatty acids which may be used include those aliphatic, saturated or unsaturated, unsubstituted, monocarboxylic acids containing 7 to 12 carbon atoms per molecule, e.g. capric, caprylic, nonanoic, lauric acid, etc.

The high molecular weight fatty acids or aliphatic monocarboxylic acids useful for forming the mixed salts of the invention include naturally-occurring or synthetic, substituted or unsubstituted, saturated or unsaturated, mixed or unmixed fatty acids having about 13 to 30, e.g. 16 to 24 carbon atoms per molecule. Examples of such acids include myristic, palmitic, stearic, hydroxy stearic (such as 12-hydroxy stearic), di-hydroxy stearic, polyhydroxy stearic, other saturated hydroxy fatty acids, arachidic, oleic, ricinoleic, hydrogenated fish oil, tallow acids, etc.

The metal component of the mixed thickeners is potassium or sodium, if the fatty acids are also converted into salts during the fusion reaction. However, if the fatty acid salts are separately added to the oil after the fusion salt is formed, then other metals can be used to form the fatty acid salts. Alternatively, the mixed salts can be prepared from fatty acid and the organic acid derived from fusing the copolymer. These other metals include alkaline earth metals, such as calcium, strontium, barium and magnesium.

The lubricating oil used in the compositions of the invention may be either a mineral lubricating oil or a synthetic lubricating oil. Synthetic lubricating oils which may be used include esters of dibasic acids (e.g. di-2-ethylhexyl sebacate), esters of glycols (e.g. $C_{13}$ Oxo acid diester of tetraethylene glycol), complex esters (e.g. the complex ester formed by reacting one mole of sebacic acid with two moles of tetraethylene glycol and two moles of 2-ethyl-hexanoic acid), halocarbon oils, alkyl silicates, sulfite esters, mercaptals, formals, polyglycol type synthetic oils, etc., or mixtures of any of the above in any proportions. However, the fusion of the copolymer should be carried out in a mineral oil, since synthetic oils will usually tend to decompose during the fusion. However, the fusion salt or fusion acid, once formed, can be used in lubricants containing the other synthetic oils noted above.

Various other additives may also be added to the lubricating composition (e.g. 0.1 to 10.0 weight percent) of detergents such as calcium petroleum sulfonate; oxidation inhibitors such as phenyl-alpha-naphthylamine; corrosion inhibitors, such as sorbitan monooleate; dyes, other grease thickeners, and the like.

The invention will be further understood by the following examples, which include preferred embodiments of the invention.

EXAMPLE I (ALL PARTS BY WEIGHT)

68.50 parts of mineral lubricating oil having a viscosity of 55 SUS. at 210° F., 10.0 parts of ethylene-vinyl acetate copolymer consisting of 27 wt. percent vinyl acetate and 73 wt. percent ethylene, and 10.0 parts of Hydrofol Acids 51 were charged to a fire heated grease kettle and mixed while warming to 125° F. The Hydrofol Acids 51 is a mixture of hydrogenated fish oil acids corresponding to stearic acid in degree of unsaturation and average chain length. Next, 4.0 parts of glacial acetic acid was charged to the kettle, followed immediately by 6.50 parts of sodium hydroxide dissolved in 9.75 parts of water (a 40 wt. percent aqueous solution of sodium hydroxide). Heating was continued until all foaming had ceased and the water resulting from the neutralization of the acetic acid and Hydrofol Acids 51 had been vaporized. Then the temperature was rapidly raised to 600° F. in order to fuse the copolymer. The entire heating schedule was as follows:

| Time (min): | Temp., °F |
|---|---|
| Start | 125 |
| 10 | 200 |
| 30 | 350 |
| 50 | 360 |
| 60 | 500 |
| 65 | 530 |
| 70 | 560 |
| 75 | 590 |
| 80 | 600 |
| 90 | 600 |
| 95 | 595 |
| 100 | 500 |

The heat was turned off at the end of 90 minutes, and the grease was cooled while stirring. 1.0 part of phenyl α-naphthylamine was added when the temperature dropped to 200° F. When the grease had cooled to 100° F., it was homogenized by passage through a Morehouse mill having 0.003" clearance. After homogenization, the grease was allowed to cool to room temperature.

EXAMPLE II

A grease was prepared by simple mixing, at room temperature, of 50 parts by weight of the product of Example I with 50 parts by weight of additional mineral lubricating oil. This mixture was then passed through a Morehouse mill having 0.003" clearance.

EXAMPLE III (A) 50 wt. percent of the product of Example II was mixed with 50 wt. percent of additional mineral lubricating oil and additional phenyl-alpha-naphthylamine was added. The resulting mixture was then passed through a Morehouse mill having 0.003" clearance. The resulting product was thixotropic. Thus, it tended to thin out to a semi-fluid consistency on working, but would recover its original consistency on standing.

(B) A portion of the product of Example III(A) was heated to 400° F. with stirring and then cooled. This eliminated the thixotropic property of Example III(A), and thereby resulted in a product having good structural stability in resisting fluidization on working.

EXAMPLE IV

A grease was prepared in the same general manner as that of Example I but using different proportions of ingredients.

EXAMPLE V 50 wt. percent product of Example IV was diluted with 50 wt. percent of additional mineral oil and the resulting product was passed through a Morehouse mill having 0.003″ clearance.

The compositions of Examples I to V prepared above, and their physical properties are summarized in the following table:

Table

| Formulation (Parts by Weight) | Examples | | | | | |
|---|---|---|---|---|---|---|
| | I | II | III-A | III-B | IV | V |
| Ethylene-Vinyl acetate copolymer | 10.00 | 5.00 | 2.50 | 2.50 | 5.0 | 2.5 |
| Hydrofol Acids 51 | 10.00 | 5.00 | 2.50 | 2.50 | 10.0 | 5.0 |
| Glacial Acetic Acid | 4.00 | 2.00 | 1.00 | 1.00 | 4.0 | 2.0 |
| Sodium Hydroxide | 6.50 | 3.25 | 1.62 | 1.62 | 6.0 | 3.0 |
| Phenyl α-naphthylamine | 1.00 | 0.50 | 1.00 | 1.00 | 1.0 | 0.5 |
| Mineral Lubricating Oil of 55 SUS. at 250° F | 68.50 | 84.25 | 91.38 | 91.38 | 74.0 | 87.0 |
| Properties: | | | | | | |
| Appearance | Excellent | Excellent | Excellent | Excellent | Excellent | Excellent |
| Dropping Point, ° F | 500+ | 500+ | 500+ | 500+ | 500+ | 500+ |
| ASTM Penetrations, 77° F. mm./10— | | | | | | |
| Unworked | 227 | 295 | 350 | 350 | 330 | 310 |
| Worked 60 strokes | 254 | 310 | Fluidizes | 355 | 250 | 320 |
| Worked 10,000 strokes | 147 | 320 | | 360 | 345 | 340 |
| ASTM Penetration at 400° F., Unworked | | | 360 | | | |
| Water Solubility | Soluble | Soluble | Soluble | Soluble | Soluble | Soluble |
| Lubrication Life,[1] Hrs., 250° F.–10,000 r.p.m | 2,000 | 1,800 | | | 1,800 | 1,550 |

[1] ABEC-NLGI Spindle Test.

As seen by the preceding table, greases having excellent properties can be prepared by the techniques of the invention. While these greases contain salts of other fatty acids to supplement the salt from the fusion, greases can be prepared solely from the fusion salt. For example, 30 parts by weight of the ethylene-vinyl acetate copolymer is fused with sodium hydroxide in mineral lubricating oil following the fusion technique of Example I to thereby form a grease thickened solely with fusion salt. Thus, lubricants can be prepared containing 5 to 40 wt. percent of fusion salt alone. However, such lubricants will not have the best possible properties, so it is usually desirable to add other fatty acid salts to form superior products.

One advantage of the present invention is that it permits formation of fatty acid salts from other materials such as olefins and vinyl esters. Thus, in time of shortage of natural fats and fatty acids, an alternate is available. Another advantage of the present invention is that it provides a way of converting into a useful product, bad batches of various copolymers which were initially made for other purposes. For example, ethylene-vinyl acetate copolymer of the type used in Example I, is comercially used as a pour depressant for heating oil. Batches of this heating oil additive, which for some reason fail to meet specifications and therefore are waste, can now be converted into useful acid salts by the technique of the invention. As another example, various high molecular weight copolymers within the present invention are used as waxes and resins. Here, again off-specification batches of materials can be used as a raw material for the processes of the present invention. While, the alkali fusion is preferably carried out in oil, the oil is not essential. Thus, some of the high molecular weight copolymers which are not oil-soluble, can be heated directly with the caustic alkali to form the fusion salts. These fusion salts can then be dispersed in oil to make lubricants and greases.

What is claimed is:

1. A lubricating composition comprising a major amount of lubricating oil and 5 to 40 wt. percent of metal salt formed by the alkali fusion of a copolymer of a $C_2$ to $C_{16}$ aliphatic alpha olefin and a vinyl ester of a $C_2$ to $C_5$ monocarboxylic acid, said copolymer containing about 1 to 30 parts by weight of olefin monomer per part by weight of said vinyl ester monomer.

2. A lubricating composition comprising a major amount of lubricating oil and 5 to 40 wt. percent of the reaction product formed by fusing a copolymer of a $C_2$ to $C_{16}$ aliphatic mono-olefin and a vinyl ester of a $C_2$ to $C_5$ monocarboxylic acid with 2 to 4 moles of caustic alkali per mole of vinyl ester in the copolymer, said copolymer containing about 1 to 30 parts by weight of the mono-olefin monomer per part of ester monomer.

3. A lubricating composition comprising a major proportion of a lubricating oil and 5 to 40 wt. percent of a mixture of metal salt of 0.1 to 2 parts by weight of $C_2$ to $C_6$ fatty acid wherein said metal is selected from the group consisting of alkali metals and alkaline earth metals; and alkali metal salt formed by the alkali fusion of one part by weight of a copolymer of ethylene and vinyl acetate containing about 1 to 30 parts by weight of ethylene monomer per part by weight of vinyl acetate monomer.

4. A lubricating composition according to claim 3, wherein said mixture includes alkali metal salt of 0.5 to 10.0 parts of $C_{13}$ to $C_{30}$ fatty acid.

5. A lubricating grease comprising a major amount of mineral lubricating oil and 10 to 35 wt. percent of the mixture of salts formed by reacting with sodium hydroxide at a temperature of about 450° to 700° F. until hydrogen evolution substantially ceases, one part by weight of a copolymer of a $C_2$ to $C_{16}$ aliphatic mono-olefin and a vinyl ester of a $C_2$ to $C_5$ fatty acid, and 1 to 5 parts by weight of a $C_{13}$ to $C_{30}$ fatty acid, said copolymer containing about 1 to 30 parts by weight of monolefin monomer per part by weight of ester monomer.

References Cited in the file of this patent

UNITED STATES PATENTS

| | | |
|---|---|---|
| 2,514,286 | Morway | July 4, 1950 |
| 2,801,972 | Bartlett et al. | Aug. 6, 1957 |
| 2,801,974 | Morway et al. | Aug. 6, 1957 |
| 2,801,975 | Bartlett et al. | Aug. 6, 1957 |
| 2,802,846 | Mertzweiller | Aug. 13, 1957 |
| 2,872,416 | Morway | Feb. 3, 1959 |
| 2,926,182 | Sutton | Feb. 23, 1960 |

FOREIGN PATENTS

| | | |
|---|---|---|
| 623,595 | Canada | July 11, 1961 |

OTHER REFERENCES

"The Merck Index of Chemicals and Drugs," Sixth Edition, pub. by Merck and Co., Inc., 1952, Rahway, New Jersey, pages 870 and 889.